Patented Apr. 7, 1925.

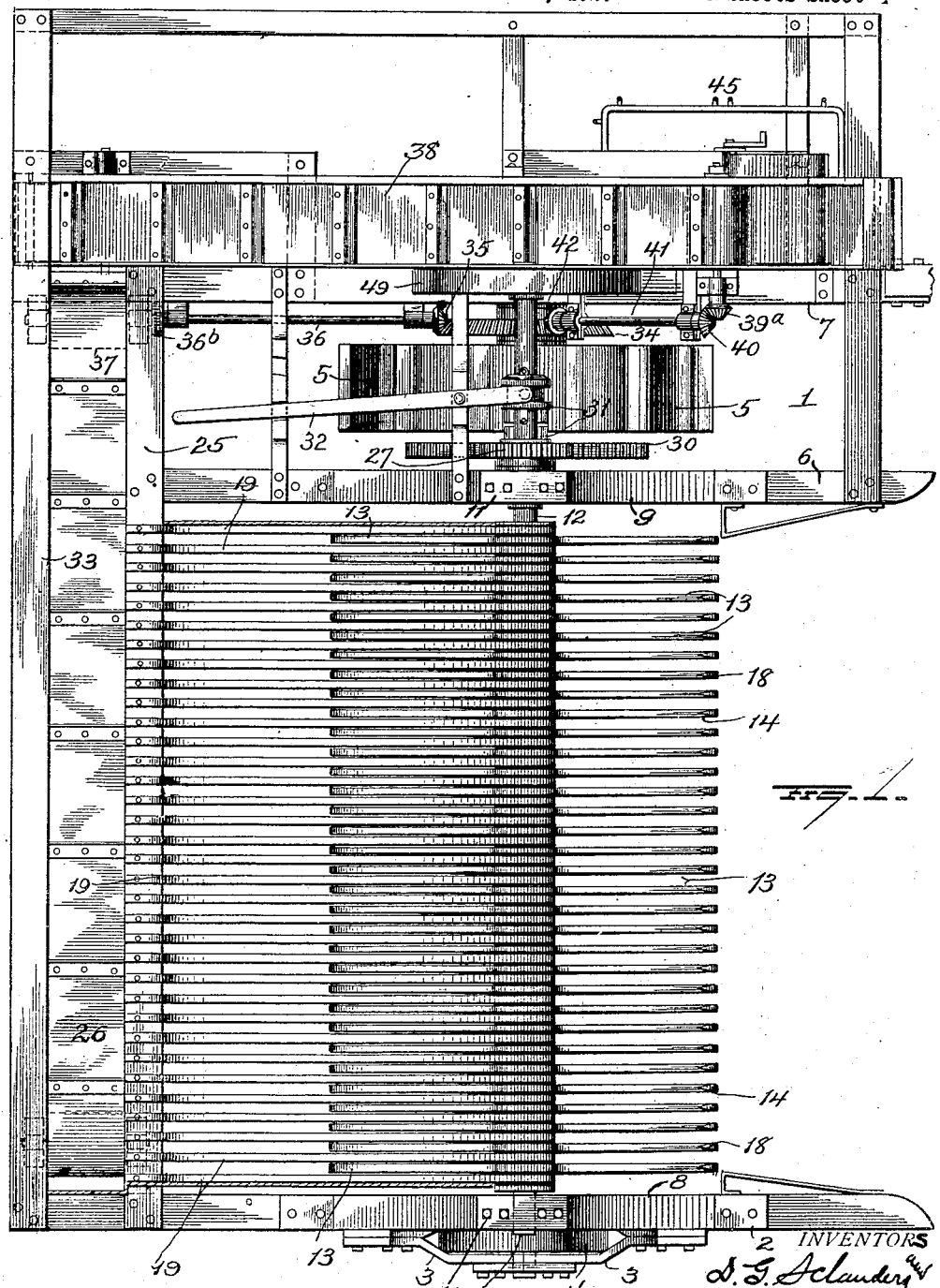

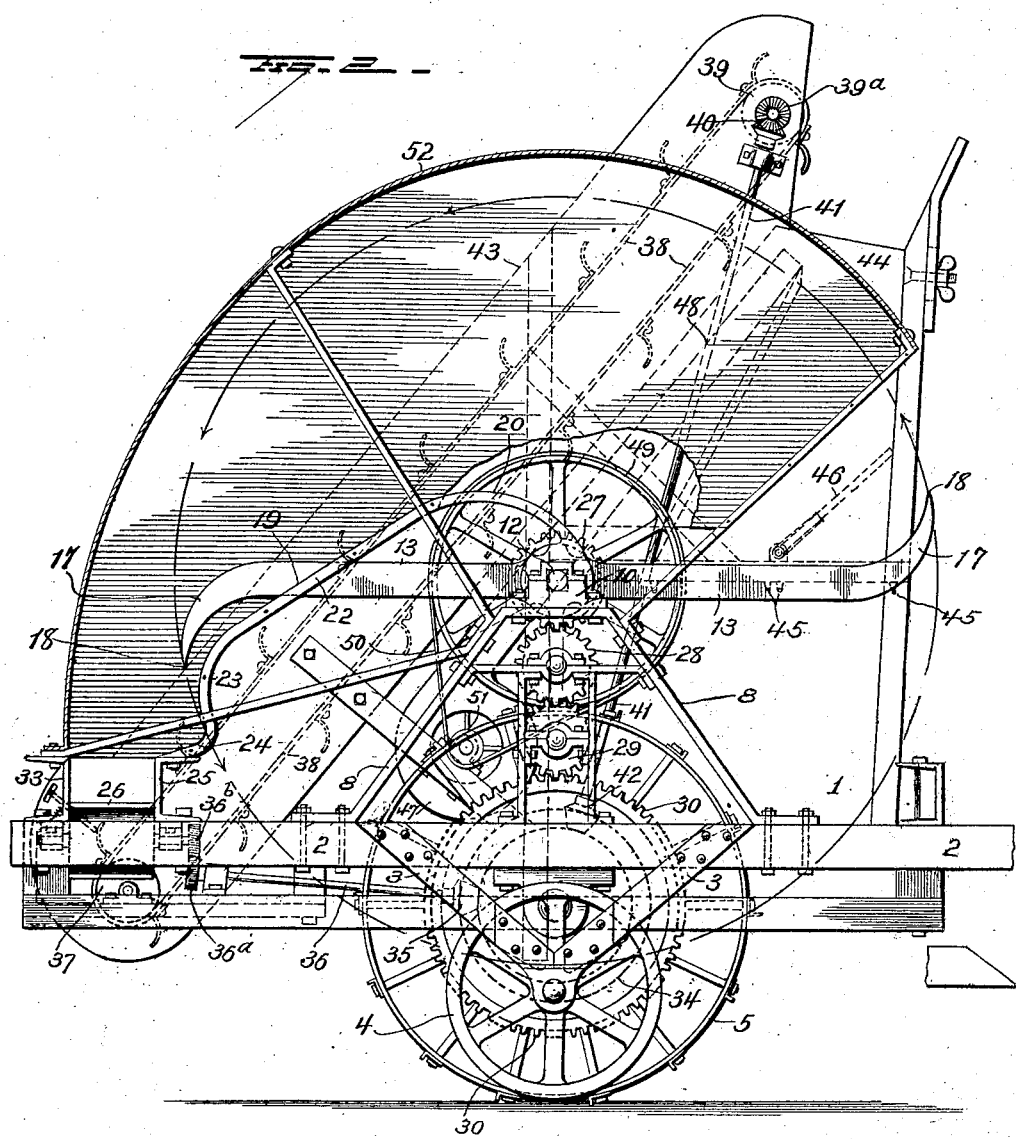

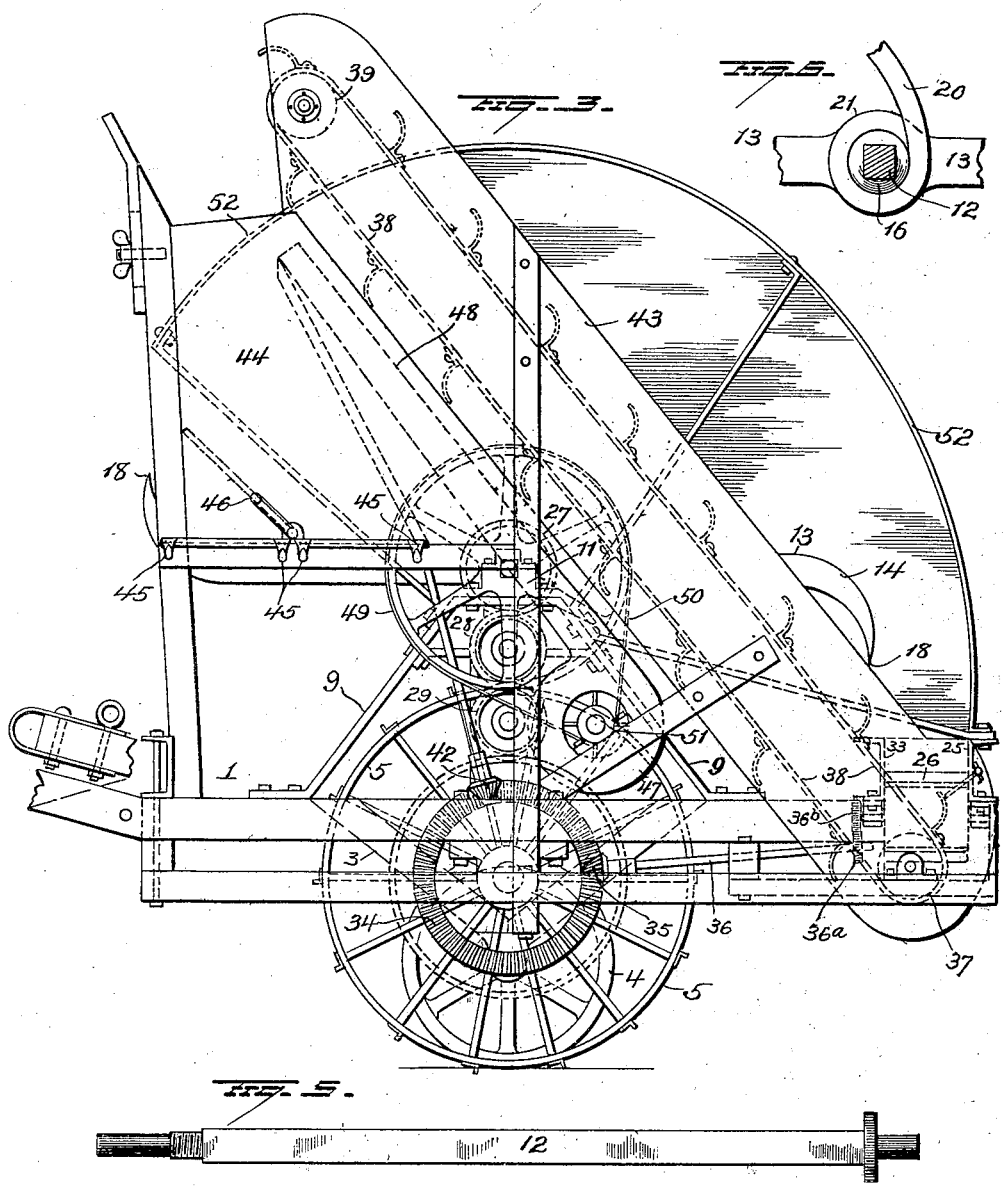

1,533,080

UNITED STATES PATENT OFFICE.

DAVID G. SCLANDERS, OF WEENEN, AND MERVYL S. SPARKS, OF KLIP RIVER, NATAL, SOUTH AFRICA.

CORN HARVESTER.

Application filed January 20, 1920. Serial No. 352,705.

*To all whom it may concern:*

Be it known that we, DAVID G. SCLANDERS and MERVYL S. SPARKS, subjects of Great Britain, and residents of Weenen and Klip River Counties, in the Province of Natal, Union of South Africa, respectively, have invented certain new and useful Improvements in Corn Harvesters; and we do hereby declare the following to be a full, clear, and exact description of the invention, such as will enable others skilled in the art to which it appertains to make and use the same.

This invention relates to improvements in corn harvesters and more particularly to that type in which the ears of corn are removed from the stalks while the latter are standing in the field,—one object of the invention being to so construct a corn harvesting machine that means shall be provided for guiding the blades, resist lateral strain to which the blades might be subjected; and so that said guiding means shall cooperate with the blades to produce a shearing action to remove portions of corn stalks which may have been detached with the ears of corn.

A further object is to so construct and mount the blades and form and arrange the guiding means that the hooked and pointed ends of the blades will be the last portions of the latter to pass between the members of the guiding means and thus avoid jamming, and to utilize said guiding means to direct the ears of corn to conveying means.

A further object is to provide a corn harvester which will operate effectually to remove the ears of corn from standing stalks, convey the ears to and deposit the same into bags, and remove extraneous matter from said ears before the ears enter the bags.

With these and other objects in view, the invention in certain novel features of construction and combinations of parts as hereinafter set forth and pointed out in the claims.

In the accompanying drawings; Figure 1 is a plan view of a corn harvester embodying our invention; Figure 2 is an elevation showing one side of the machine; Figure 3 is an elevation of the other side of the machine; Figure 4 is a separate view of one of the double blades; Figure 5 is a separate view of the blade shaft, and Figure 6 is a view showing one of the spacing collars 16 and one of the guide bars mounted thereon.

1 represents suitable framework, to one side beam 2 of which a bearing bracket 3 is secured and affords a mounting for the axle of a side ground wheel 4. Near the opposite side of the frame, the axle of a traction wheel 5 is mounted in suitable bearings on beams 6, 7 of the framework,—the traction wheel being disposed between said beams 6, 7.

Brackets 8, 9 are mounted upon and secured to the beams 2 and 6 of the framework and to these brackets journal boxes 10, 11 are secured, and afford bearings for the cylindrical portions of a shaft 12,—the major portion of said shaft being angular (preferably square) in cross section. The shaft 12 carries a series of double blades 13 having hub portions 14, the latter having openings 15 which are the same shape as is the cross section of the shaft so that said double blades will be rotated by said shaft. The blades are spaced apart by means of collars 16 having openings to conform to the shape of the shaft 12 and having cylindrical peripheral portions.

Each member of each double blade is provided with a curved free end portion 17 and these curved portions are made tapering and pointed at their extremity as indicated at 18. The portion 17 at one end of each double blade is curved in a direction reverse to that of the portion 17 at the other end, and the curved and pointed portions at respective ends of each blade are adapted successively to remove the ears of corn from the stalks as the blades rotate. The ears of corn so removed from the stalks will be carried upwardly by the blades and deposited upon a series of guide bars 19. The upper portions of these guide bars are curved as at 20 and the free ends of these curved portions are formed into loops 21 which freely embrace the spacing collars 16 so that the latter may rotate freely within said loops of the guide bars when the shaft 12 and blades 13 are rotated. From the curved portions 20, the guide bars incline downwardly and rearwardly as at 22, and at the lower ends of the inclined portions, the guide bars are curved downwardly as at 23 and then rearwardly in an inclined direction as at 24, the rear end portions 24 being secured to a beam 25 near the rear end of the framework. It will be observed that during a portion of the rotary travel of the blades, they will pass between the spaced guide bars and the latter will resist any lateral strain to which the blades may be subjected during such portion of the travel of the latter. It will also be seen that the curved and pointed end of a blade member will be the last to enter between the guide bars and that these curved and pointed portions will pass between the lower curved portions 23 of said guide bars and from which the ears of corn will be discharged, and thus jamming of corn on the guide bars will be prevented. Should portions of stalks be removed with the ears of corn and deposited upon the guide bars, the blades, cooperating with said guide bars, will produce a shearing action which will cause removal of the portions of stalks from the ears of corn, and these stalk portions will drop between the guide bars and become deposited upon the ground.

The guide bars 19 serve, not only as guides for the blades but, collectively, form a discharge platform on which the ears of corn are deposited and by which they are directed to a conveyor 26 near the rear end of the framework.

For the purpose of rotating the shaft 12 and thus operating the blades 13, a gear 27 is secured to the shaft 12 and receives motion, through the medium of gears 28, 29, from a large gear 30 rotatable with the traction wheel 5. The rotation of the blade shaft 12 may be controlled by means of a clutch 31, one member of which may be carried by the gear 27 and the other member slidingly keyed to said shaft and operable by means of a hand lever 32.

A beam 33 is secured to the framework parallel with the beam 25 and spaced therefrom for the accommodation of the conveyor 26. A gear 34 is rotatable with the traction wheel 5 and transmits motion to a bevel pinion 35 on one end of a shaft 36, the other end of said shaft being connected, through gears 36$^a$, 36$^b$, with a pulley or roller 37 over which the conveyor 26 passes and by which motion is imparted to said conveyor.

The ears of corn falling upon the conveyor 26 will be delivered by the latter to an inclined elevating conveyor 38 and the shaft of the upper roller 39 over which latter this conveyor 38 passes is provided with a bevel pinion 39$^a$ receiving motion from a bevel pinion 40 on a shaft 41 and the other end of this shaft carries a bevel pinion 42 meshing with the gear 34. The conveyor 38 may be enclosed within a housing 43, as shown in Figures 2 and 3, and this conveyor discharges into a hopper 44. At the bottom of the hopper, bag holders 45 are provided, and a deflector 46 may be provided in the hopper to cause the corn to be discharged into one bag while a filled bag is being removed and replaced by an empty bag.

A blower 47 may be provided to discharge air through a chute 48 and afford a blast of air at the entrance end of the hopper 44 to remove any chaff or fine particles which may be discharged from the conveyor 38. The blower may be driven from the blade shaft 12,—the latter having a large pulley 49 secured thereto and operating to transmit motion, through a belt 50 to a small pulley 51 on the blower shaft.

With the use of our improvements, the ears of corn will be removed from the stalks regardless of the height of the latter and even though the stalks may be bent over so as to nearly lie upon the ground.

In order to avoid the possibility of the ears of corn being thrown by the blades, past the guide bars, we may provide a hood, such as shown at 52.

Various changes might be made in the details of construction of our invention without departing from the spirit thereof or limiting its scope and hence we do not wish to restrict ourselves to the precise details herein set forth.

Having fully described our invention what we claim as new and desire to secure by Letters-Patent, is:—

1. In a corn harvester, the combination with framework, of a plurality of shearing blades revolubly mounted thereon and a plurality of guide bars between which said blades are movable and upon which the blades will deliver the severed ears of corn, said blades and guide bars being so relatively disposed that shearing action may be produced during the movement of the blades between said guide bars.

2. In a corn harvester, the combination with framework, of a plurality of shearing blades revolubly mounted thereon, and a plurality of spaced guide bars between which said blades are movable, and with which they are cooperable to produce shearing action, said guide bars extending rearwardly and downwardly approximately from the axis about which said blades revolve and from the inner end portions of said blades.

3. In a corn harvester, the combination with framework, of a shaft mounted thereon, means for rotating said shaft, a plurality of double blades located between their ends on said shaft and rotatable therewith, and guide bars extending rearwardly and downwardly approximately from the axis of rotation of said shaft and between which guide bars the blades are movable, the upper portions of said guide bars being sufficiently near said shaft to insure the falling of the ears of corn upon them.

4. In a corn harvester, the combination with framework, of a shaft mounted thereon, means for rotating said shaft, a plurality of blades carried by and projecting from said shaft and spaced apart, and a plurality of fixed guide bars extending rearwardly and downwardly approximately from the axis of rotation of said shaft, said guide bars being spaced apart to permit the passage of the blades, the upper portions of said guide bars being sufficiently near said shaft to insure the falling of the ears of corn upon them.

5. In a corn harvester, the combination with framework, of a plurality of spaced blades, means for rotating said blades simultaneously, and an inclined discharge platform comprising a plurality of spaced guide bars, between which the blades are movable, the upper portion of said platform being sufficiently near the axis of rotation of the blades to insure the falling of the ears of corn onto the same from the blades.

6. In a corn harvester, the combination with framework, and a shaft mounted thereon, of a plurality of double-ended blades carried by and projecting from said shaft and rotatable therewith, each double ended blade being curved and pointed in one direction at one end and in the reverse direction at the other end, spaced guide bars extending rearwardly and downwardly approximately from the axis of said shaft and between which guide bars said blades are movable, the upper portions of said guide bars being sufficiently near said shaft to insure the falling of the ears of corn upon them, and means for rotating said shaft and blades.

7. In a corn harvester, the combination with farmework, a shaft mounted thereon, and means for rotating said shaft, of a plurality of spaced blades carried by said shaft, a plurality of spaced guide bars between which said blades are movable, each guide bar having a curved upper end terminating at one end adjacent to said shaft and each guide bar having an inclined portion extending rearwardly from said curved portion and having a downwardly curved portion at the rear lower end of said inclined portion.

8. In a corn harvester, the combination with framework, of a revoluble shaft mounted thereon, a plurality of blades carried by and rotatable with said shaft, a plurality of collars between said blades and rotatable with the shaft, a plurality of guide bars spaced apart and permitting passage of the blades between them, said guide bars being secured at their rear lower ends to the framework and having loops at their forward upper ends, said loops mounted freely on the collars on said shaft, and means for rotating said shaft.

9. In a corn harvester, the combination with framework, and a revoluble shaft, of a plurality of shearing blades carried by said shaft, an inclined discharge platform through which said blades are movable and in cooperation with which said blades may have a shearing action, said platform extending rearwardly approximately from the axis of said shaft, the upper portion of said platform being sufficiently near said shaft to insure the falling of the ears onto the same, and means for rotating said shaft.

10. In a corn harvester, the combination with framework, of a revoluble shaft mounted thereon, a plurality of blades carried by said shaft, a plurality of fixed guide bars extending rearward from said shaft and spaced apart for the passage of the blades, a conveyor onto which said guide bars discharge, an elevating conveyor communicating with said first-mentioned conveyor, a hopper into which said elevating conveyor discharges, a blower discharging at the upper portion of the hopper, a ground wheel, and gearing actuated by said ground wheel for rotating the blade shaft and operating said conveyors and blower.

In testimony whereof, we have signed this specification in the presence of two subscribing witnesses.

DAVID G. SCLANDERS.
MERVYL S. SPARKS.

Witnesses:
W. S. HODGE,
R. S. FERGUSON.